(12) United States Patent
Pattok et al.

(10) Patent No.: US 7,950,274 B2
(45) Date of Patent: May 31, 2011

(54) SYSTEM AND METHOD FOR DETERMINING AN ABSOLUTE ROTATIONAL POSITION OF A VEHICLE STEERING COLUMN

(75) Inventors: Kathryn L. Pattok, Frankenmuth, MI (US); Geoff P. Krieger, Bay City, MI (US); Tony Dodak, Frankenmuth, MI (US); William H. Wittig, Saginaw, MI (US); Steve R. Bannister, Bay City, MI (US)

(73) Assignee: Nexteer (Beijing) Technology Co., Ltd.

( * ) Notice: Subject to any disclaimer, the term of this patent is extended or adjusted under 35 U.S.C. 154(b) by 331 days.

(21) Appl. No.: 12/107,809

(22) Filed: Apr. 23, 2008

(65) Prior Publication Data

US 2008/0282788 A1 Nov. 20, 2008

Related U.S. Application Data

(60) Provisional application No. 60/938,754, filed on May 18, 2007.

(51) Int. Cl.
*G01M 17/06* (2006.01)
(52) U.S. Cl. .................................................. 73/117.02
(58) Field of Classification Search ............... 73/117.02, 73/862.328, 862.331
See application file for complete search history.

(56) References Cited

U.S. PATENT DOCUMENTS

| | | | |
|---|---|---|---|
| 6,456,914 B1 * | 9/2002 | Fratini et al. | 701/41 |
| 6,535,805 B2 * | 3/2003 | Amberkar et al. | 701/41 |
| 6,687,590 B2 * | 2/2004 | Kifuku et al. | 701/43 |
| 6,763,293 B2 | 7/2004 | Dilger | |
| 6,775,604 B2 | 8/2004 | Dilger | |
| 7,149,615 B2 * | 12/2006 | Ura | 701/41 |
| 7,295,907 B2 | 11/2007 | Lu et al. | |
| 7,500,538 B2 * | 3/2009 | Hara et al. | 180/412 |
| 7,549,504 B2 * | 6/2009 | Krieger et al. | 180/444 |
| 7,555,402 B2 * | 6/2009 | Barthomeuf et al. | 702/151 |
| 7,565,947 B2 * | 7/2009 | Ogawa et al. | 180/444 |
| 7,725,227 B2 * | 5/2010 | Pattok et al. | 701/41 |
| 2002/0188389 A1 * | 12/2002 | Ashrafi | 701/29 |
| 2003/0033064 A1 * | 2/2003 | Amberkar et al. | 701/41 |
| 2007/0295895 A1 * | 12/2007 | Amberkar et al. | 250/231.13 |
| 2009/0112403 A1 * | 4/2009 | Wittig et al. | 701/41 |
| 2009/0125187 A1 * | 5/2009 | Yamamoto et al. | 701/42 |
| 2009/0150026 A1 * | 6/2009 | Wittig et al. | 701/41 |

\* cited by examiner

*Primary Examiner* — Freddie Kirkland, III
(74) *Attorney, Agent, or Firm* — Cantor Colburn LLP

(57) ABSTRACT

A method for determining an absolute rotational position of a vehicle steering column is provided. In one exemplary embodiment, the method determines a relative position of a steering assist motor utilizing a relative position sensor. Thereafter, the method determines the absolute rotational position of the vehicle steering column based upon the relative position of the steering assist motor.

5 Claims, 14 Drawing Sheets

SYSTEM AND METHOD FOR DETERMINING AN ABSOLUTE ROTATIONAL POSITION OF A VEHICLE STEERING COLUMN

CROSS REFERENCE TO RELATED APPLICATION

The application claims the benefit of U.S. Provisional application Ser. No. 60/938,754, filed May 18, 2007, the contents of which are incorporated herein by reference thereto.

BACKGROUND

Vehicle steering systems have utilized absolute position sensors to determine absolute positions of vehicle steering columns. A drawback with an absolute position sensor is that the sensor is relatively expensive to utilize in a vehicle steering system.

Accordingly, the inventors herein have recognized a need for a method for determining an absolute position of a vehicle steering column without utilizing an absolute position sensor.

SUMMARY OF THE INVENTION

A method for determining an absolute rotational position of a vehicle steering column in accordance with an exemplary embodiment is provided. The vehicle steering column is operably coupled to a steering assist motor. The method includes determining whether a vehicle is being driven substantially straight relative to a longitudinal axis of the vehicle on a roadway. The method further includes when the vehicle is being driven substantially straight, then performing steps of: (i) determining a plurality of relative motor rotational position values from signals received from a relative position sensor operably coupled to the steering assist motor, (ii) determining a plurality of relative vehicle steering column rotational position values based on the plurality of relative motor rotational position values, (iii) determining a rotational position offset value from the plurality of relative vehicle steering column rotational position values, (iv) determining an absolute rotational position value from a current relative vehicle steering column rotational position value and the rotational position offset value, the absolute rotational position value being indicative of the absolute rotational position of the vehicle steering column, and (v) storing the absolute rotational position value in a memory device.

A method for determining an absolute rotational position range of a vehicle steering column in accordance with another exemplary embodiment is provided. The method includes initializing an initial absolute rotational position value equal to a predetermined value. The method further includes rotating the vehicle steering column in a first rotational direction. The method further includes determining a plurality of absolute rotational position values indicating a plurality of absolute rotational positions of the vehicle steering column during the rotation of the vehicle steering column. The method further includes determining the absolute rotational position range of the vehicle steering column based on the plurality of absolute rotational position values, and both an upper rotational position limit value and a lower rotational position limit value associated with the vehicle steering column.

A method for storing an absolute rotational position value associated with a vehicle steering column in accordance with another exemplary embodiment is provided. The method includes detecting vehicle ignition shutdown. The method further includes iteratively determining a plurality of absolute rotational position values associated with the vehicle steering column for a predetermined time interval after the vehicle ignition shutdown. The method further includes storing a last valid absolute rotational position value from the plurality of absolute rotational position values, in a non-volatile memory device.

A method for centering a vehicle steering column utilizing a steering assist motor in accordance with another exemplary embodiment is provided. The method includes determining a plurality of rotational position offset values indicating a plurality of relative rotational positions of the vehicle steering column when a vehicle is being driven substantially straight relative to a longitudinal axis of the vehicle. The method further includes determining whether the plurality of rotational position offset values are substantially consistent with one another for a first predetermined time interval, and if so, generating a commanded torque command for the steering assist motor to move the vehicle steering column in a first rotational direction toward an absolute rotational center position.

A method for centering a vehicle steering column utilizing a steering assist motor in accordance with another exemplary embodiment is provided. The method includes determining an absolute rotational position range of the vehicle steering column, utilizing a relative position sensor operably coupled to the steering assist motor. The method further includes determining whether the absolute rotational position range is fully rightwardly of an absolute center position of the vehicle steering column or fully leftwardly of the absolute center position of the vehicle steering column. The method further includes if the absolute rotational position range is fully rightwardly of the absolute center position of the vehicle steering column, then generating a first commanded torque command to induce the steering assist motor to move the vehicle steering column in a first rotational direction toward the absolute rotational center position. The method further includes if the absolute rotational position range is fully leftwardly of the absolute center position of the vehicle steering column, then generating a second commanded torque command to induce the steering assist motor to move the vehicle steering column in a second rotational direction toward the absolute rotational center position, the second rotational direction being opposite the first rotational direction.

A method for selecting a rotational position value associated with a vehicle steering column in accordance with another exemplary embodiment is provided. The method includes determining a first absolute rotational position value associated with the vehicle steering column from a current relative vehicle steering column rotational position value and a rotational position offset value. The method further includes determining an absolute rotational position range of the vehicle steering column based on a plurality of absolute rotational position values, and both an upper rotational position limit value and a lower rotational position limit value associated with the vehicle steering column. The method further includes retrieving a stored last valid absolute rotational position value from a non-volatile memory device. The method further includes if a first confidence value associated with the first absolute rotational position value is greater than a first threshold value, then selecting the first absolute rotational position value, else if a second confidence value associated with the absolute rotational position range is greater than a second threshold value, then selecting the absolute rotational position range, else if a third confidence value associated with the stored last valid absolute rotational position value is greater than a third threshold value, then selecting the stored last valid absolute rotational position value.

DESCRIPTION OF EXEMPLARY EMBODIMENTS

Figure 1:
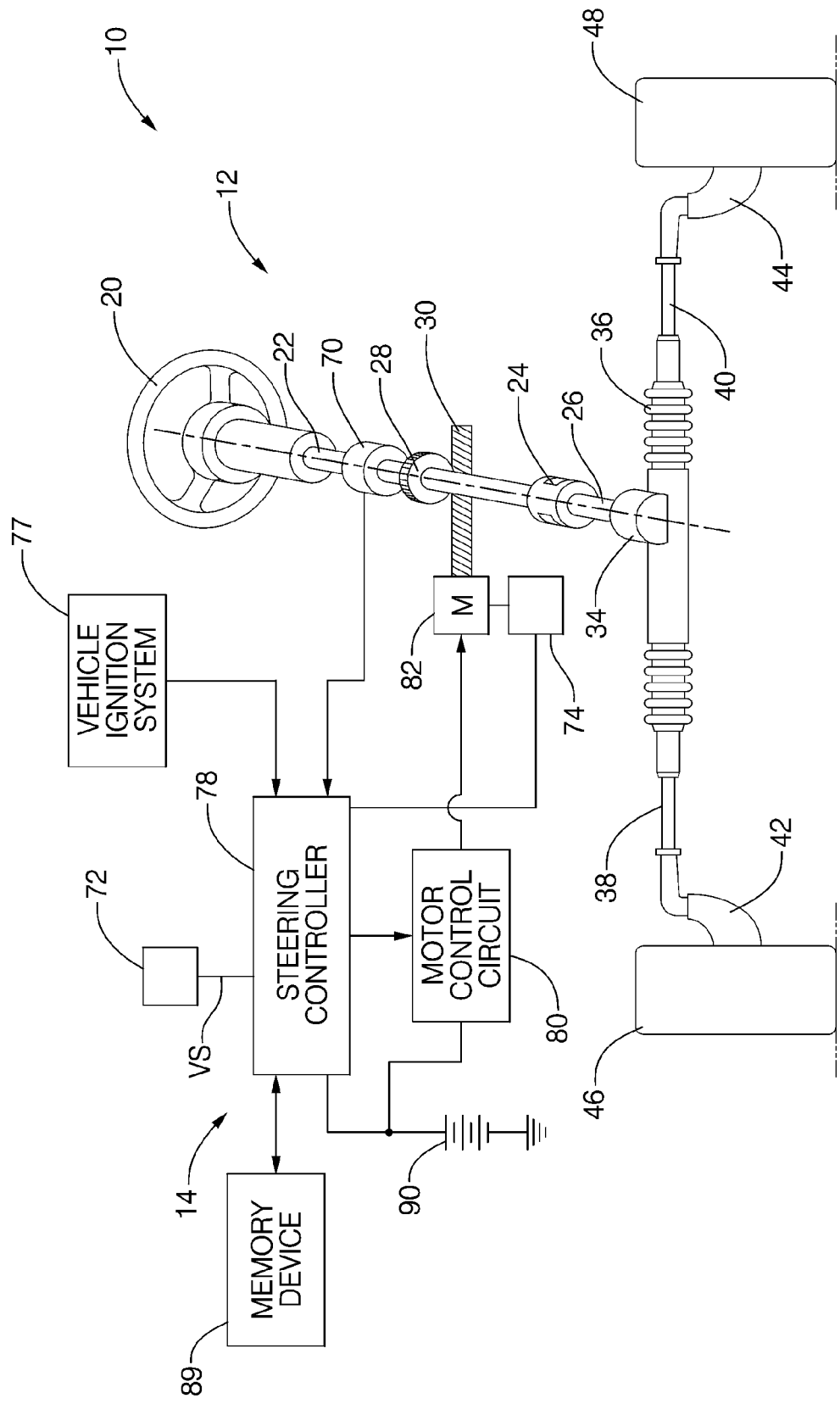
FIG. 1 is a schematic of a vehicle having a steering system and a control system in accordance with an exemplary embodiment.
Figure 2:
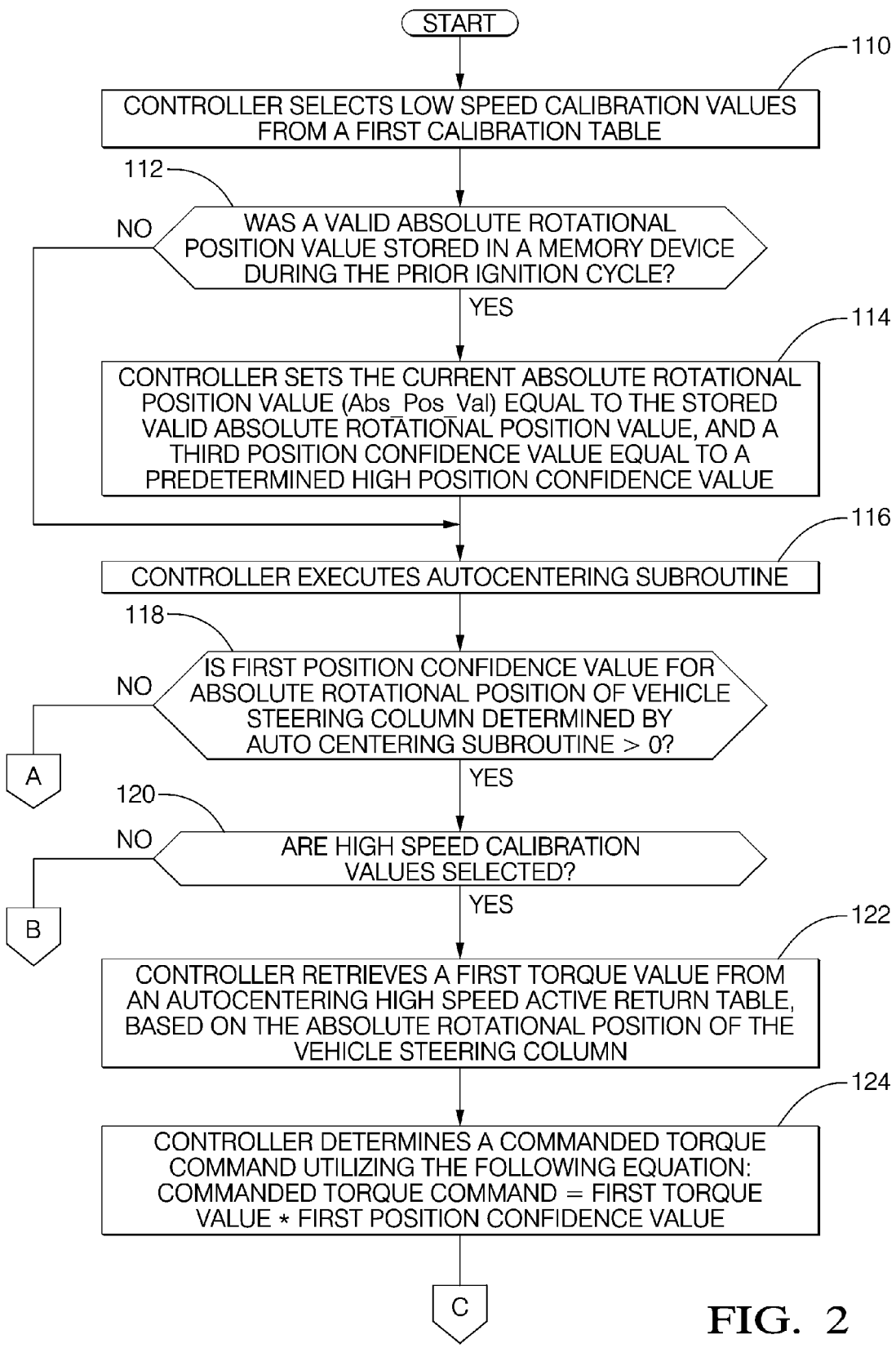
FIGS. 2-13 are flowcharts of a method for controlling a steering assist motor in the steering system of FIG. 1 utilizing the control system of FIG. 1.
Figure 3:
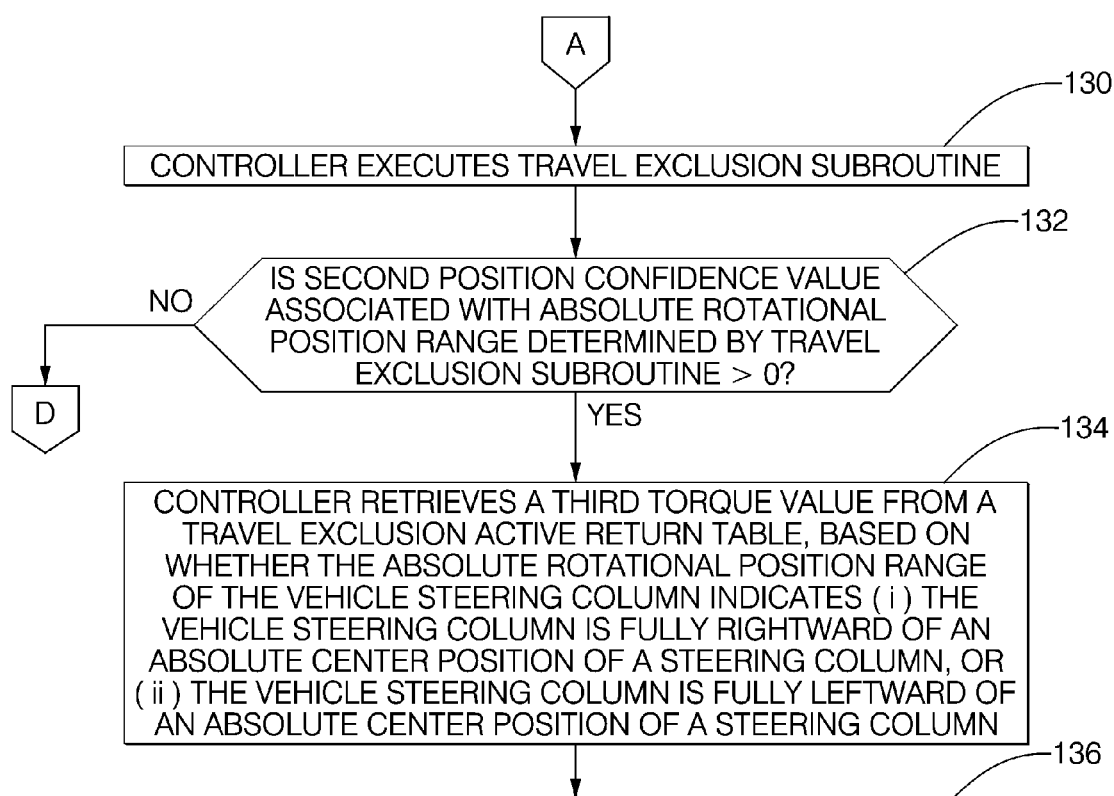
Figure 4:
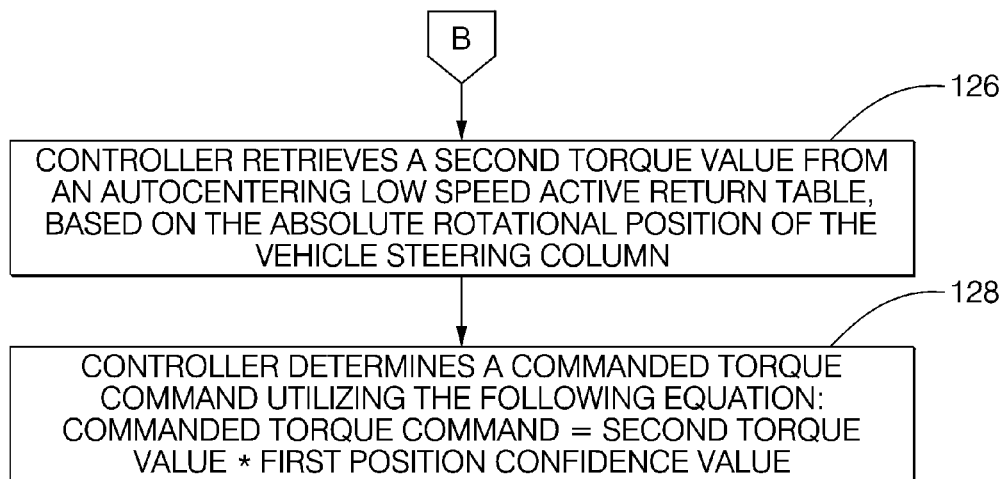
Figure 5:
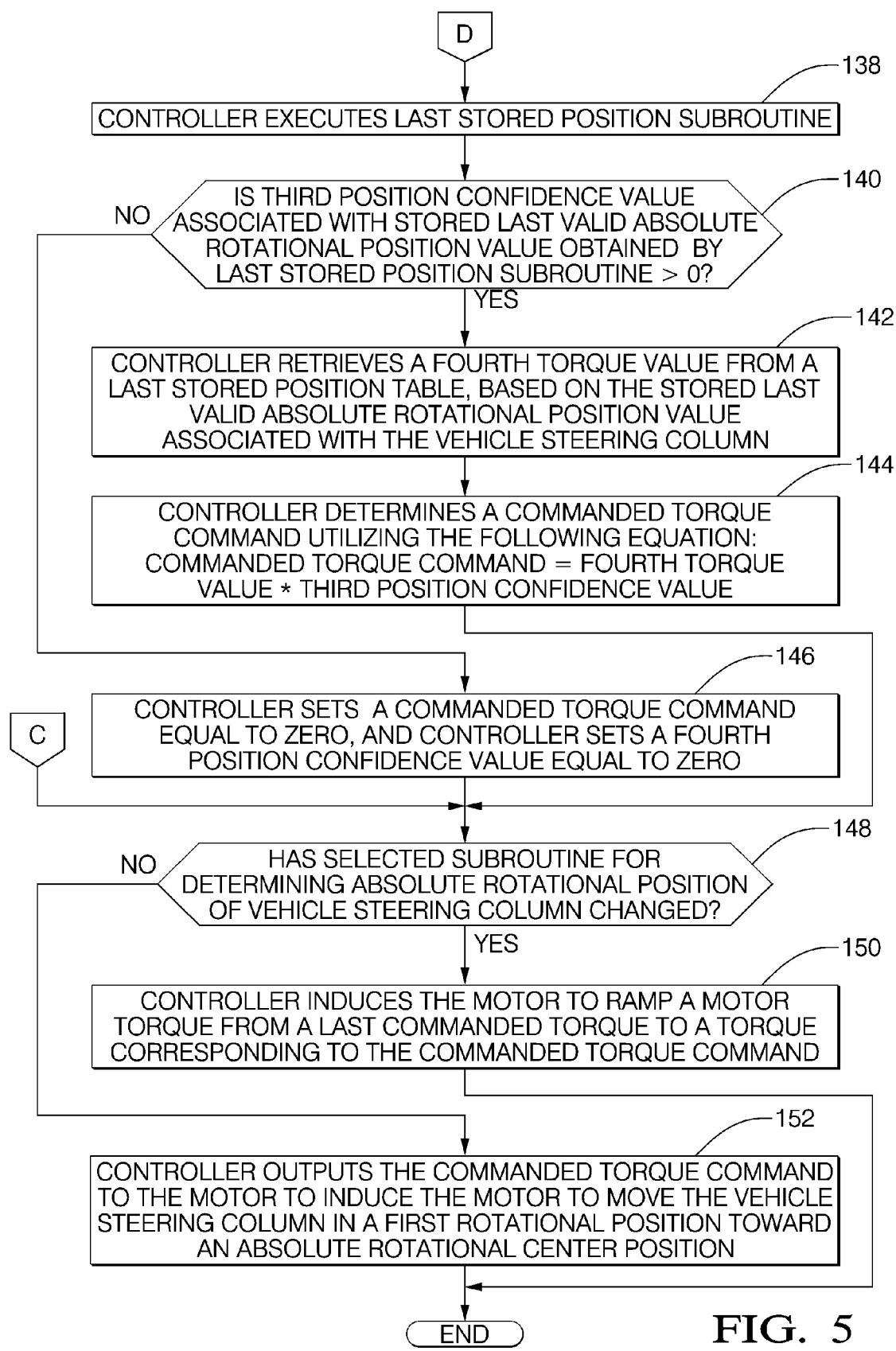

Referring to FIG. 1, a vehicle 10 having a steering system 12 and a control system 14 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

The steering system 12 is provided to steer the vehicle 10 in a desired direction. The steering system includes a handwheel 20, an upper steering column 22, a universal joint 24, a lower steering column 26, a worm gear 28, a worm 30, a gear housing 34, a steering mechanism 36, tie rods 38, 40, steering knuckles 42, 44, and roadway wheels 46, 48. In one exemplary embodiment, the steering system 12 is an electric power steering system that utilizes a rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering column 22 connected to the lower steering column 26 turns the pinion gear. Rotation of the pinion gear moves the toothed rack which moves the tie rods 39, 40 which in turn moves the steering knuckles 42, 44, respectively, which turns the roadway wheels 46, 48, respectively.

The control system 14 is provided to assist in controlling the steering system 12. In particular, the control system 14 provides: (i) electric power steering assist for assisting a vehicle operator in steering the vehicle and (ii) active auto-centering of the vehicle steering column when the vehicle 10 is being driven substantially straight relative to a longitudinal axis of the vehicle 10. The control system 14 includes a column torque sensor 70, a vehicle speed sensor 72, a motor position sensor 74, a vehicle ignition system 77, a steering controller 78, a motor control circuit 80, and a battery 90.

The steering column torque sensor 70 is provided to generate a signal (Col_Torq) indicative of an amount of torque being applied to the vehicle handwheel 20 and the upper steering column 22 by a vehicle operator. In one exemplary embodiment, the steering column torque sensor 70 includes a torsion bar (not shown) which outputs a variable-resistance signal to the controller 78 based on an amount of twist of the torsion bar. Of course, in alternative embodiments, other types of torque sensors known to those skilled in the art could be utilized.

The vehicle speed sensor 72 is provided to generate a signal (VS) indicative of a speed of the vehicle 10. The vehicle speed sensor 72 operably communicates with the steering controller 78.

The motor position sensor 74 is provided to generate a signal indicative of a relative rotational or angular position of a rotor of the steering assist motor 82. The motor position sensor 74 operably communicates with the steering controller 78.

The vehicle ignition system 77 is provided to control ignition a vehicle engine (not shown) in the vehicle 10. The vehicle ignition system 77 operably communicates with the steering controller 78. During operation, the steering controller 78 queries the vehicle ignition system 77 to determine when an ignition shutdown event occurs.

The steering controller 78 is provided to generate control signals that are received by the motor control circuit 80 for controlling operation of the steering assist motor 82. In particular, the steering controller 78 is configured to control the steering assist motor 82 to provide electric power steering assist for assisting a vehicle operator in steering the vehicle 10, and to provide active auto-centering of a vehicle steering column when the vehicle 10 is being driven substantially straight relative to a longitudinal axis of the vehicle. The steering controller 78 is electrically coupled to the steering column torque sensor 70, the vehicle speed sensor 72, the motor position sensor 74, the vehicle ignition system 77, and the motor control circuit 80.

The motor control circuit 80 is provided to receive command torque control signals from the steering controller 78 and to generate electrical currents for controlling operation of the steering assist motor 82. As shown, the motor control circuit 80 is electrically coupled between the steering controller 78 and the steering assist motor 82. The motor 82 is configured to drive the worm 30 which is operably coupled to the worm gear 28 for moving the lower steering column 26, the steering mechanism 36, tie rods 38, 40, steering knuckles 42, 44, toward an operational position wherein the road wheels 46, 48 have a desired front road wheel angle.

The battery 90 provides electrical power to the steering controller 78 and to the motor control circuit 80. As shown, the battery 90 is electrically coupled to the steering controller 78 and to the motor control circuit 80.

Referring to FIGS. 2-13, a flowchart of a method for determining an absolute position of a vehicle steering column and for controlling the steering assist motor 82 will now be explained. In particular, the method can determine an absolute rotational position of either the vehicle steering column 26 or the vehicle steering column 22 based on a relative position signal from the motor position sensor 74 operably coupled to the steering assist motor 82. However, for purposes of simplicity, the flowchart will describe determining an absolute rotational position of the vehicle steering column 26.

At step 110, the controller 78 selects Low Speed Calibration Values from a first calibration table. After step 110, the method advances to step 112.

At step 112, the controller 78 makes a determination as to whether a valid absolute rotational position value was stored in a memory device 89 during the prior ignition cycle. If the value of step 112 equals "yes", the method advances to step 114. Otherwise, the method advances to step 116.

At step 114, the controller 78 sets the current absolute rotational position value (Abs_Pos_Val) equal to the stored valid absolute rotational position value, and a third position confidence value equal to a predetermined high position confidence value. After step 114, the method advances to step 116.

At step 116, the controller 78 executes an Autocentering subroutine which will be explained.

At step 118, the controller 78 makes a determination as to whether a first position confidence value for an absolute rotational position of a vehicle steering column 26 determined by the Autocentering subroutine is greater than zero. If the value of step 118 equals "yes", the method advances to step 120. Otherwise, the method advances to step 130 which executes a Travel Exclusion subroutine.

At step 120, the controller 78 makes a determination is whether High Speed Calibration Values have been selected. If the value of step 120 equals "yes", the method advances to step 122. Otherwise, the method advances to step 126.

At step 122, the controller 78 retrieves a first torque value from an Autocentering High Speed Active Return Table, based on the absolute rotational position of the vehicle steering column 26. After step 122, the method advances to step 124.

At step 124, the controller 78 determines a commanded torque command utilizing the following equation: commanded torque command=first torque value*first position confidence value. After step 124, the method advances to step 148.

Referring again to step 120, if the value of step 120 equals "no", the method advances to step 126. At step 126, the controller 78 retrieves a second torque value from an Autocentering Low Speed Active Return Table, based on the absolute rotational position of the vehicle steering column. After step 126, the method advances to step 128.

At step 128, the controller 78 determines a commanded torque command utilizing the following equation: commanded torque command=second torque value*first position confidence value. After step 128, the method advances to step 148.

Referring again to step 118, if the value of step 118 equals "no", the method advances to step 130. At step 130, the controller 78 executes the Travel Exclusion subroutine which will be explained in further detail below. After step 130, the method advances to step 132.

At step 132, the controller 78 makes a determination as to whether a second position confidence value associated with absolute rotational position range determined by the Travel Exclusion subroutine is greater than zero. If the value of step 132 equals "yes", the method advances to step 134. Otherwise, the method advances to step 138.

At step 134, the controller 78 retrieves a third torque value from a Travel Exclusion Active Return Table, based on whether the absolute rotational position range of the vehicle steering column 26 indicates (i) the vehicle steering column 26 is fully rightward of an absolute center position of the steering column, or (ii) the vehicle steering column 26 is fully leftward of an absolute center position of the steering column. After step 134, the method advances to step 136.

At step 136, the controller 78 determines a commanded torque command utilizing the following equation: commanded torque command=third torque value*second position confidence value. After step 136, the method advances to step 148.

Referring again to step 132, if the value of step 132 equals "no", the method advances to step 138. At step 138, the controller 78 executes a Last Stored Position subroutine which will be explained in further detail below. After step 138, the method advances to step 140.

At step 140, the controller 78 makes a determination as to whether a third position confidence value associated with a stored last valid absolute rotational position value obtained by Last Stored Position subroutine is greater than zero. If the value of step 140 equals "yes", the method advances to step 142. Otherwise, the method advances to step 146.

At step 142, the controller 78 retrieves a fourth torque value from a Last Stored Position Table, based on the stored last valid absolute rotational position value associated with the vehicle steering column 26. After step 142, the method advances to step 144.

At step 144, the controller 78 determines a commanded torque command utilizing the following equation: commanded torque command=fourth torque value*third position confidence value. After step 144, the method advances to step 148.

Referring again to step 140, if the value of step 140 equals "no", the method advances to step 146. At step 146, the controller 78 sets a commanded torque command equal to zero, and controller 78 sets a fourth position confidence value equal to zero. After step 146, the method advances to step 148.

At step 148, the controller 78 makes a determination as to whether a selected subroutine for determining an absolute rotational position of vehicle steering column 26 has changed. For example, when the Autocentering subroutine is initially utilized to determine the absolute rotational position of the steering column 26, and thereafter, the Travel Exclusion subroutine is utilized to determine the absolute rotational position, the subroutine for determining the position has changed. If the value of step 148 equals "yes", the method advances to step 150. Otherwise, the method advances to step 152.

At step 150, the controller 78 induces the motor 82 to ramp a motor torque from a last commanded torque to a torque corresponding to the commanded torque command. After step 150, the method is exited.

At step 152, the controller 78 outputs the commanded torque command to the motor 82 to induce the motor 82 to move the vehicle steering column 26 in a first rotational position toward an absolute rotational center position. After step 152, the method is exited.

Figure 6:
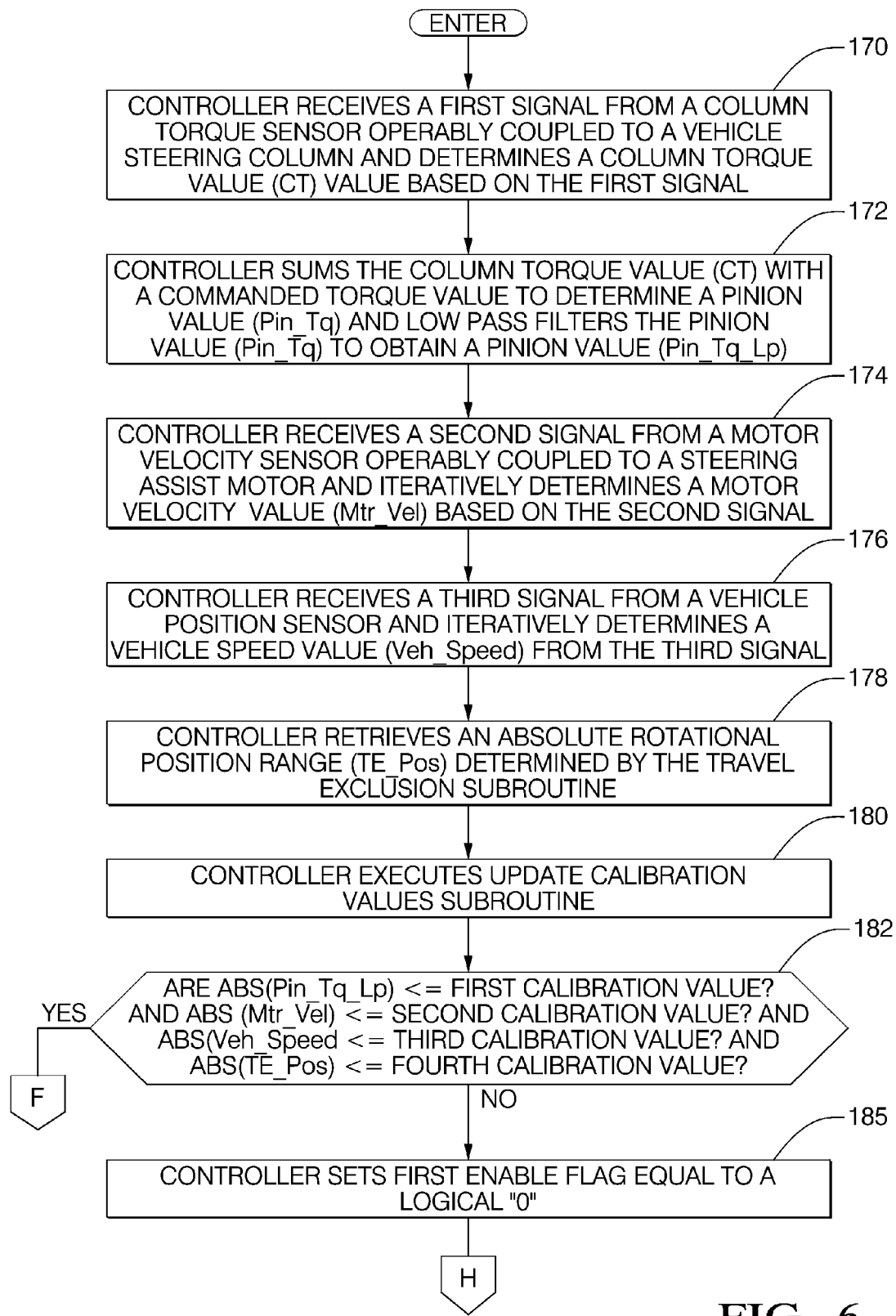
Figure 7:
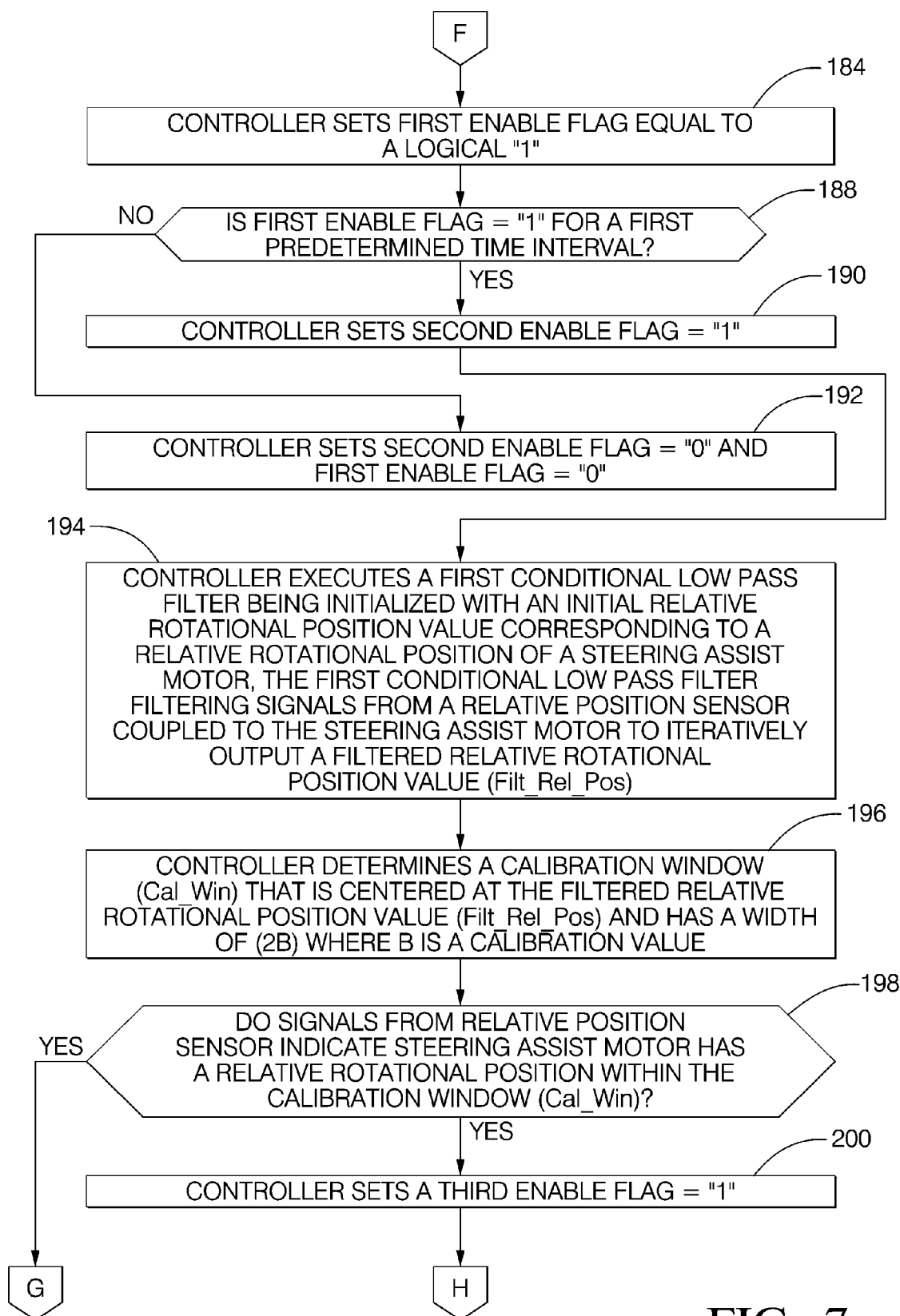
Figure 8:
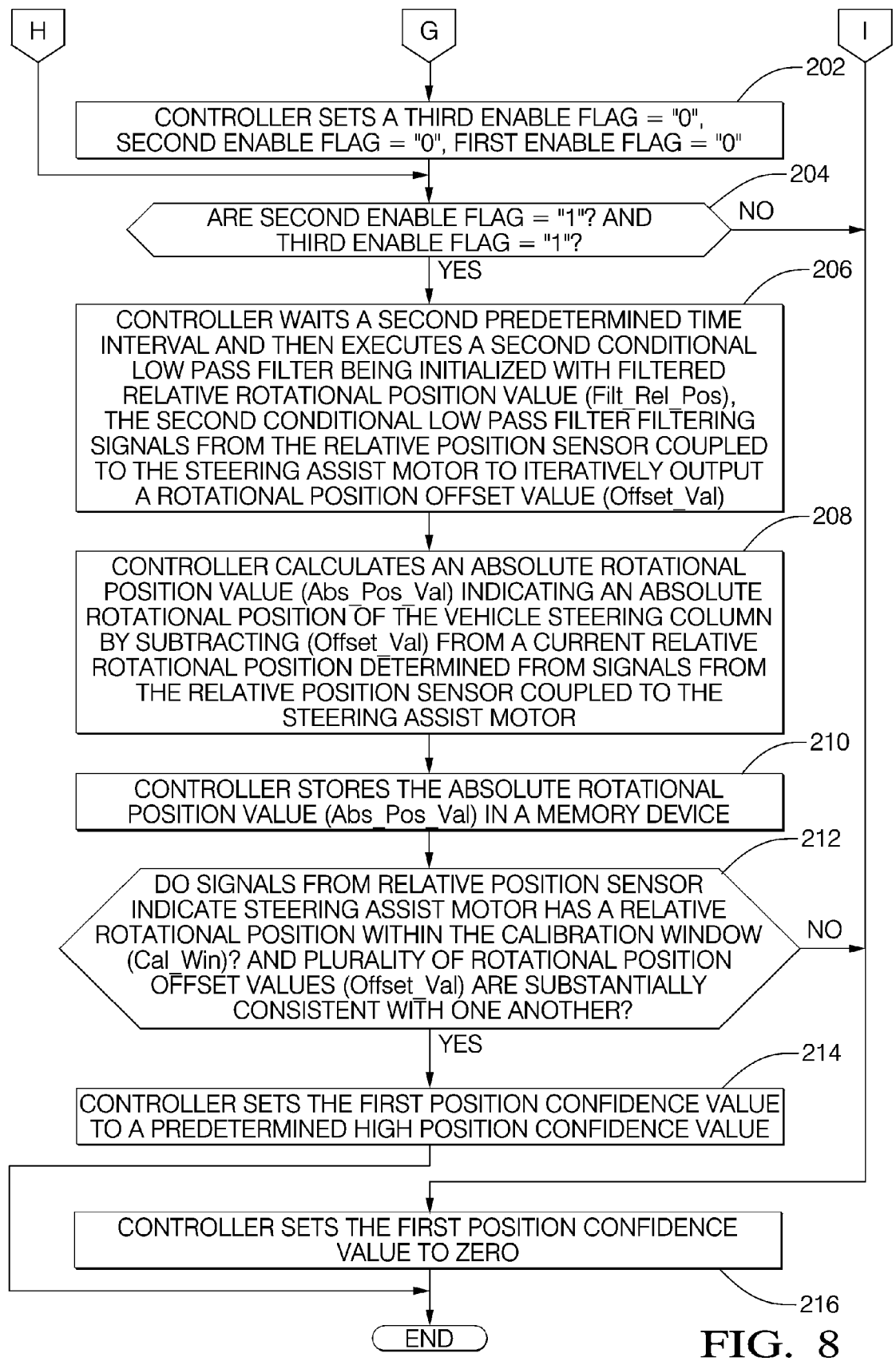

Referring to FIGS. 6-8, the Autocentering subroutine will now be explained.

At step 170, the controller 78 receives a first signal from the column torque sensor 70 operably coupled to a vehicle steering column 26 and determines a column torque value (CT) value based on the first signal.

At step 172, controller 78 sums the column torque value (CT) with a commanded torque value to determine a pinion value (Pin_Tq) and low pass filters the pinion value (Pin_Tq) to obtain a pinion value (Pin_Tq_Lp).

At step 174, the controller 78 receives a second signal from the motor position sensor 74 operably coupled to the steering assist motor 82 and iteratively determines a motor velocity value (Mtr_Vel) based on the second signal.

At step 176, the controller 78 receives a third signal from the vehicle speed sensor 72 and iteratively determines a vehicle speed value (Veh_Speed) from the third signal.

At step 178, the controller 78 retrieves an absolute rotational position range (TE_Pos) determined by the Travel Exclusion subroutine.

At step 180, the controller 78 executes an Update Calibration Values subroutine which will be explained in further detail hereinafter.

At step 182, the controller 78 makes a determination as to whether the following conditions are met: (i) Abs(Pin_Tq_Lp)<=first calibration value, (ii) Abs(Mtr_Vel)<=second calibration value, (iii) Abs(Veh_Speed)<=third calibration value, and (iv) Abs(TE_Pos)<=fourth calibration value. The term "Abs" corresponds to an absolute value. If the value of step 182 equals "yes", the method advances to step 184. Otherwise, the method advances to step 183.

At step 183, the controller sets the first enable flag equal to logical "0." After step 183, the method advances to step 216.

At step 184, the controller 78 sets the first enable flag equal to a logical "1." After step 184, the method advances to step 188.

At step 188, the controller 78 makes a determination as to whether the first enable flag="1" for a first predetermined time interval. If the value of step 188 equals "yes", the method advances to step 190. Otherwise, the method advances to step 192.

At step 190, the controller 78 sets a second enable flag="1." After step 190, the method advances to step 194.

At step 192, the controller 78 sets the second enable flag="0" and the first enable flag="0." After step 192, the method advances to step 216.

At step 194, the controller 78 executes a first conditional low pass filter being initialized with an initial relative rotational position value corresponding to a relative rotational position of the steering assist motor 82. The first conditional low pass filter filters signals from the relative position sensor 74 coupled to the steering assist motor 82 to iteratively output a filtered relative rotational position value (Filt_Rel_Pos). It should be noted that the first conditional low pass filter filters an input signal when the first and second enable flags equal "1", and the first conditional low pass filter holds its prior filtered value when the first and second enable flags do not equal "1." After step 194, the method advances to step 196.

At step 196, the controller 78 determines a calibration window (Cal_Win) that is centered at the filtered relative rotational position value (Filt_Rel_Pos) and has a width of (2B) where B is a calibration value. After step 196, the method advances to step 198.

At step 198, the controller 78 makes a determination as to whether signals from relative position sensor 74 indicates the steering assist motor 82 has a relative rotational position within the calibration window (Cal_Win). If the value of step 198 equals "yes", the method advances to step 200. Otherwise, the method advances to step 202.

At step 200, the controller 78 sets a third enable flag="1." After step 200, the method advances to step 204.

At step 202, the controller 78 sets the third enable flag="0", the second enable flag="0", and the first enable flag="0." After step 202, the method advances to step 204.

At step 204, the controller 78 makes a determination as to whether the second enable flag="1" and the third enable flag="1." If the value of step 204 equals "yes", the method advances to step 206. Otherwise, the method advances to step 216.

At step 206, the controller 78 waits a second predetermined time interval and then executes a second conditional low pass filter being initialized with filtered relative rotational position value (Filt_Rel_Pos), the second conditional low pass filter filtering signals from the relative position sensor 74 coupled to the steering assist motor 82 to iteratively output a rotational position offset value (Offset_Val). It should be noted that the second conditional low pass filter only filters an input signal when the first, second and third enable flags maintain a logical "1" value during the second predetermined time interval, and the second conditional low pass filter holds its prior filtered value when the first, second and third enable flags do not equal "1." After step 206, the method advances to step 208.

At step 208, the controller 78 calculates an absolute rotational position value (Abs_Pos_Val) indicating an absolute rotational position of the vehicle steering column 26 by subtracting (Offset_Val) from a current relative rotational position determined from signals from the relative position sensor 74 coupled to the steering assist motor 82. After step 208, the method advances to step 210.

At step 210, controller 78 stores the absolute rotational position value (Abs_Pos_Val) in the memory device 89. After step 210, the method advances to step 212.

At step 212, the controller 78 makes a determination as to whether signals from the relative position sensor 74 indicates the steering assist motor 82 has a relative rotational position within the calibration window (Cal_Win) and a plurality of rotational position offset values (Offset_Val) are substantially consistent with one another. If the value of step 212 equals "yes", the method advances to step 214. Otherwise, the method advances to step 216.

At step 214, the controller 78 sets the first position confidence value to a predetermined high position confidence value. After step 214, the Autocentering subroutine is exited.

At step 216, the controller 78 sets the first position confidence value to zero. After step 216, the Autocentering subroutine is exited.

Figure 9:
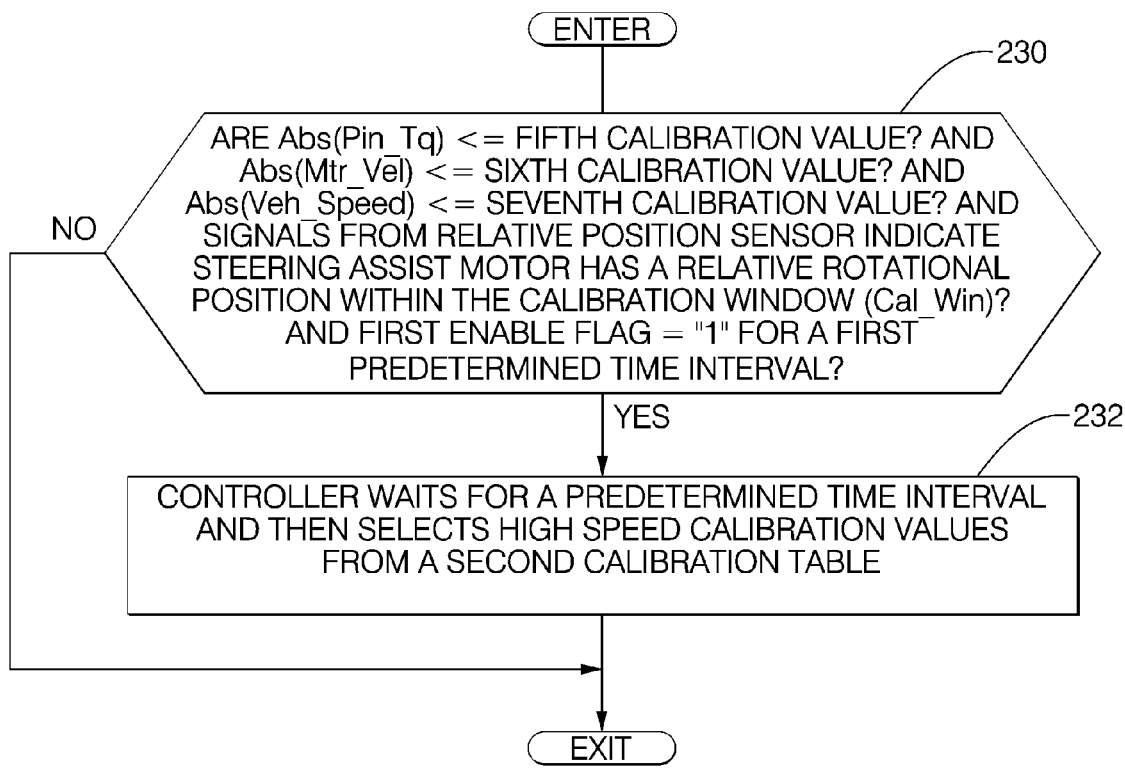

Referring to FIG. 9, the Update Calibration Values subroutine will now be explained.

At step 230, the controller 78 makes a determination as to whether the following conditions are met: (i) Abs(Pin_Tq) <=fifth calibration value, (ii) Abs(Mtr_Vel)<=sixth calibration value, (iii) Abs(Veh_Speed)<=seventh calibration value, (iv) signals from the relative position sensor 74 indicate the steering assist motor 82 has a relative rotational position within the calibration window (Cal_Win), and (v) first enable flag="1" for a first predetermined time interval. If the value of step 230 equals "yes", the method advances to step 232. Otherwise, the Update Calibration Values subroutine is exited.

At step 232, the controller 78 waits for a predetermined time interval and then selects High Speed Calibration Values from a second calibration table. It should be noted that the step 232 is only executed when the value of step 230 is equal to "yes" for the predetermined time interval. After step 232, the Update Calibration Values subroutine is exited.

Figure 10:
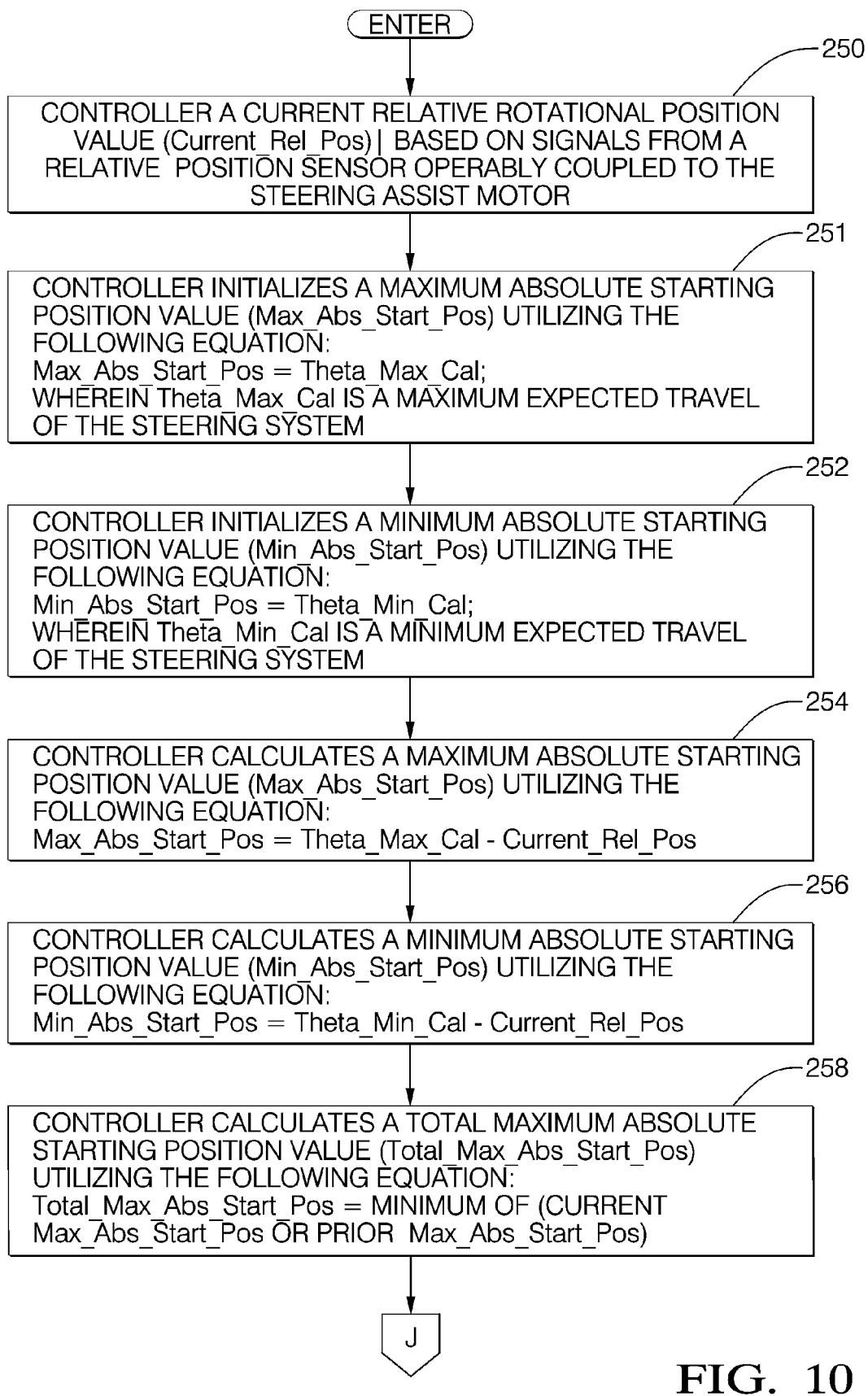
Figure 11:
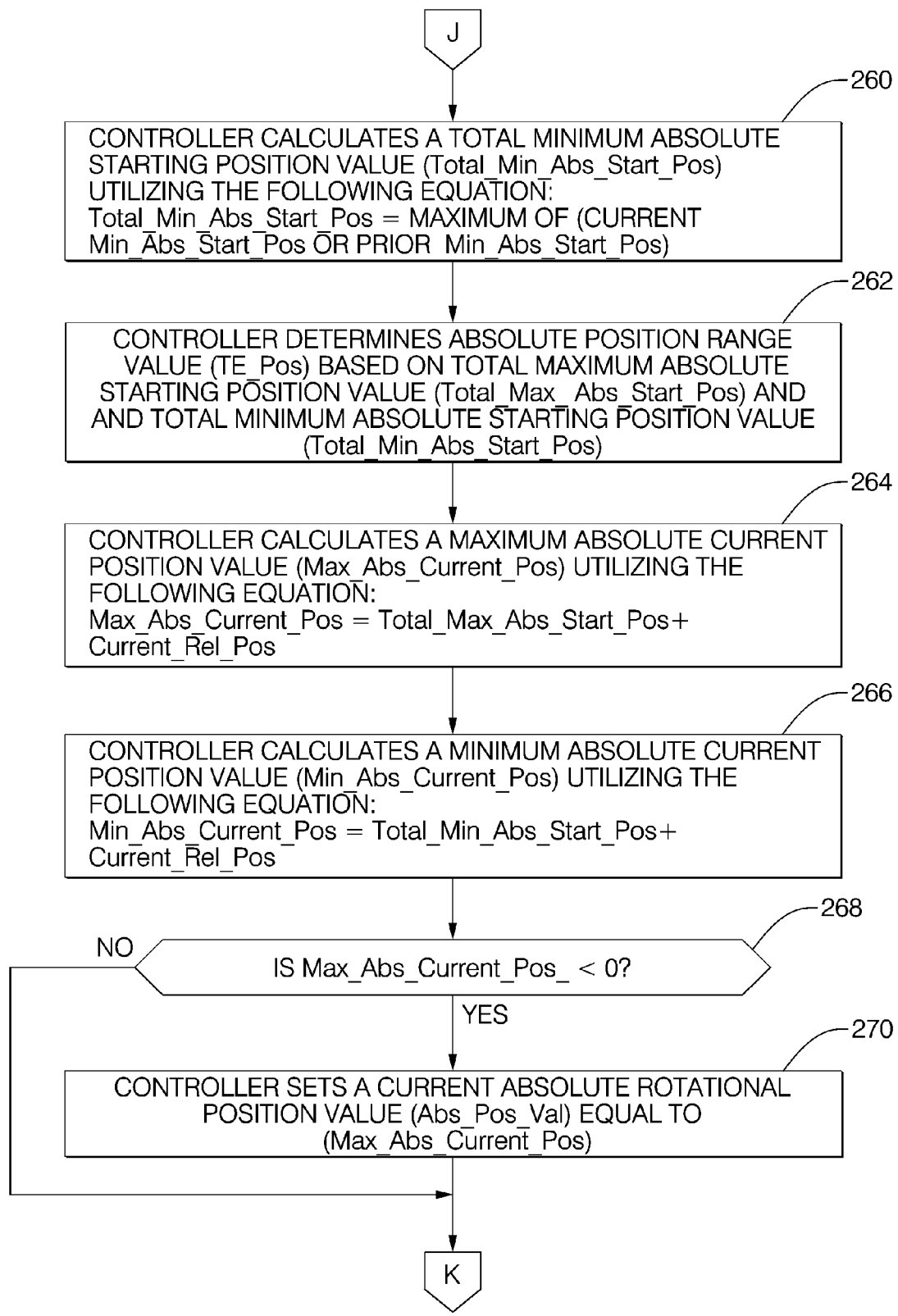
Figure 12:
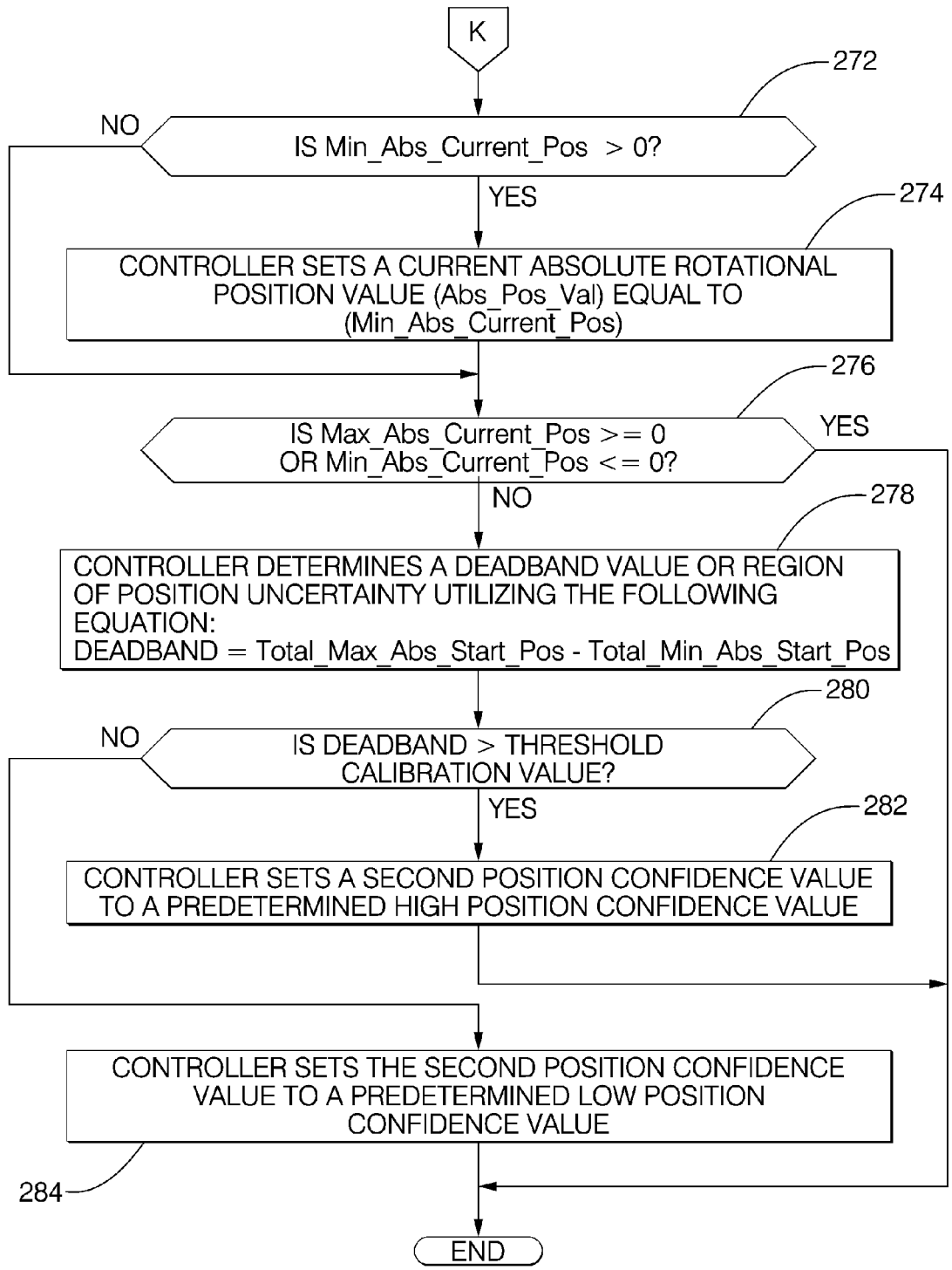

Referring to FIGS. 10-12, the Travel Exclusion subroutine will now be explained.

At step 250, the controller 78 calculates a current relative rotational position value (Current_Rel_Pos) based on signals from the relative position sensor 74 operably coupled to the steering assist motor 82. After step 250, the method advances to step 251.

At step 251, the controller 78 initializes a maximum absolute starting position value (Max_Abs_Start_Pos) utilizing the following equation:

Max_Abs_Start_Pos=Theta_Max_Cal;

wherein Theta_Max_Cal is a maximum expected travel of the steering system. After step 251, the method advances to step 252.

At step 252, the controller 78 initializes a minimum absolute starting position value (Min_Abs_Start_Pos) utilizing the following equation:

Min_Abs_Start_Pos=Theta_Min_Cal;

wherein Theta_Min_Cal is a minimum expected travel of the steering system. It should be noted that in one exemplary embodiment, Theta_Min_Cal is a negative number. After step 252, the method advances to step 254.

At step 254, the controller 78 calculates the maximum absolute starting position value (Max_Abs_Start_Pos) utilizing the following equation:

Max_Abs_Start_Pos=Theta_Max_Cal−Current_Rel_Pos.

After step 254, the method advances to step 256.

At step 256, the controller 78 calculates the minimum absolute starting position value (Min_Abs_Start_Pos) utilizing the following equation:

Min_Abs_Start_Pos=Theta_Min_Cal_Current_Rel_Pos.

After step 256, the method advances to step 258.

At step 258, the controller 78 calculates a total maximum absolute starting position value (Total_Max_Abs_Start_Pos) utilizing the following equation:

Total_Max_Abs_Start_Pos=minimum of (current Max_Abs_Start_Pos or prior Max_Abs_Start_Pos).

After step 258, the method advances to step 260.

At step 260, the controller 78 calculates a total minimum absolute starting position value (Total_Min_Abs_Start_Pos) utilizing the following equation:

Total_Min_Abs_Start_Pos=maximum of (current Min_Abs_Start_Pos or prior Min_Abs_Start_Pos).

After step 260, the method advances to step 262.

At step 262, the controller 78 determines absolute position range value (TE_Pos) based on total maximum absolute starting position value (Total_Max_Abs_Start_Pos) and total minimum absolute starting position value (Total_Min_Abs_Start_Pos). After step 262, the method advances to step 264.

At step 264, the controller 78 calculates a maximum absolute current position value (Max_Abs_Current_Pos) utilizing the following equation:

Max_Abs_Current_Pos=Total_Max_Abs_Start_Pos+Current_Rel_Pos.

After step 264, the method advances to step 266.

At step 266, the controller 78 calculates a minimum absolute current position value (Min_Abs_Current_Pos) utilizing the following equation:

Min_Abs_Current_Pos=Total_Min_Abs_Start_Pos+Current_Rel_Pos.

After step 266, the method advances to step 268.

At step 268, the controller 78 makes a determination as to whether the Max_Abs_Current_Pos is less than zero. If the value of step 268 equals "yes", the method advances to step 270. Otherwise, the method advances to step 272.

At step 270, the controller 78 sets a current absolute rotational position value (Abs_Pos_Val) equal to (Max_Abs_Current_Pos). After step 270, the method advances to step 272.

At step 272, the controller 78 makes a determination as to whether the Min_Abs_Current_Pos is greater than zero. If the value of step 272 equals "yes", the method advances to step 274. Otherwise, the method advances to step 276.

At step 274, the controller 78 sets a current absolute rotational position value (Abs_Pos_Val) equal to (Min_Abs_Current_Pos). After step 274, the method advances to step 276.

At step 276, the controller 78 makes a determination as to whether Max_Abs_Current_Pos>=0 or Min_Abs_Current_Pos<=0. If the value of step 276 equals "no", the method advances to step 278. Otherwise, the Travel Exclusion subroutine is exited.

At step 278, the controller 78 determines a deadband value or region of position uncertainty utilizing the following equation: Deadband=Total_Max_Abs_Start_Pos−Total_Min_Abs_Start_Pos. After step 278, the method advances to step 280.

At step 280, the controller 78 makes a determination as to whether the Deadband is greater than a threshold calibration value. The value of step 280 equals "yes", the method advances to step 282. Otherwise, the method advances to step 284.

At step 282, the controller 78 sets a second position confidence value to a predetermined high position confidence value. After step 282, the Travel Exclusion subroutine is exited.

At step 284, the controller 78 sets the second position confidence value to a predetermined low position confidence value. After step 284, the Travel Exclusion subroutine is exited.

Figure 13:
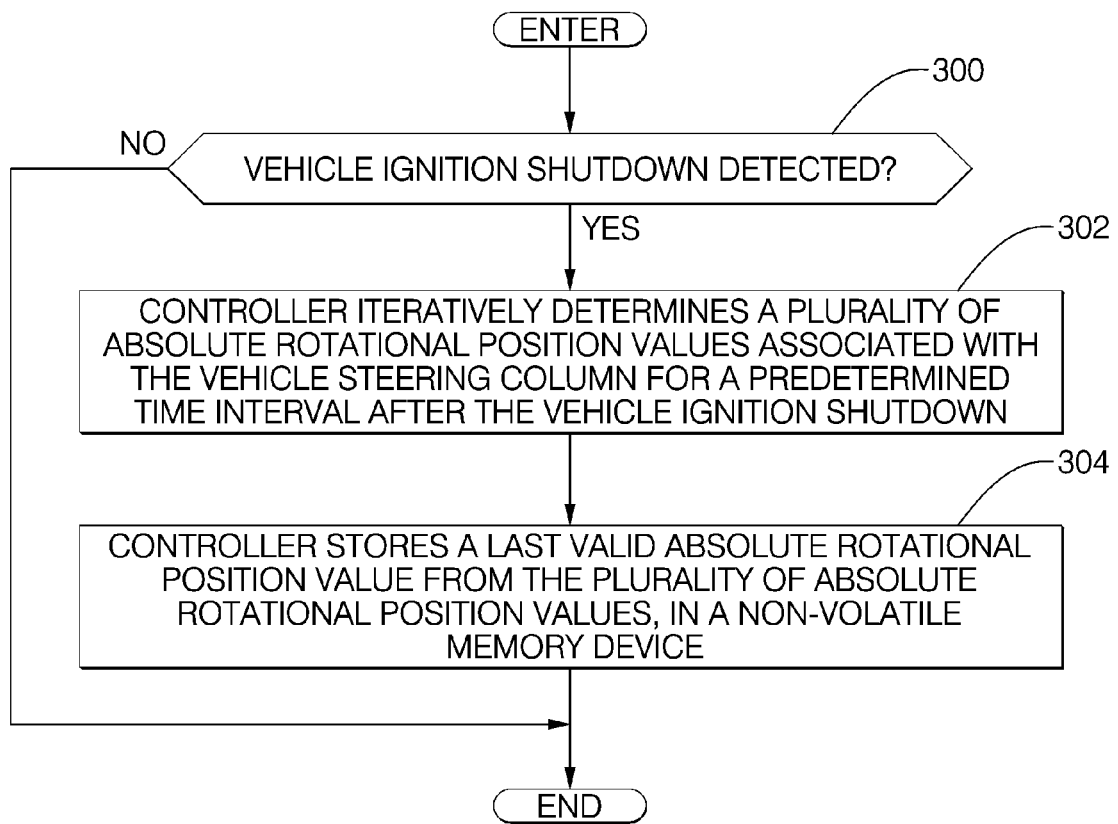

Referring to FIG. 13, the Last Stored Position subroutine will now be explained.

At step 300, the controller 78 makes a determination as to whether vehicle ignition shutdown has been detected. If the value of step 300 equals "yes", the method advances to step 302. Otherwise, the Last Stored Position subroutine is exited.

At step 302, the controller 78 iteratively determines a plurality of absolute rotational position values associated with the vehicle steering column 26 for a predetermined time interval after the vehicle ignition shutdown. After step 302, the method advances to step 304.

At step 304, the controller 78 stores a last valid absolute rotational position value from the plurality of absolute rotational position values, in the non-volatile memory device 89. After step 304, the Last Stored Position subroutine is exited.

Figure 14:
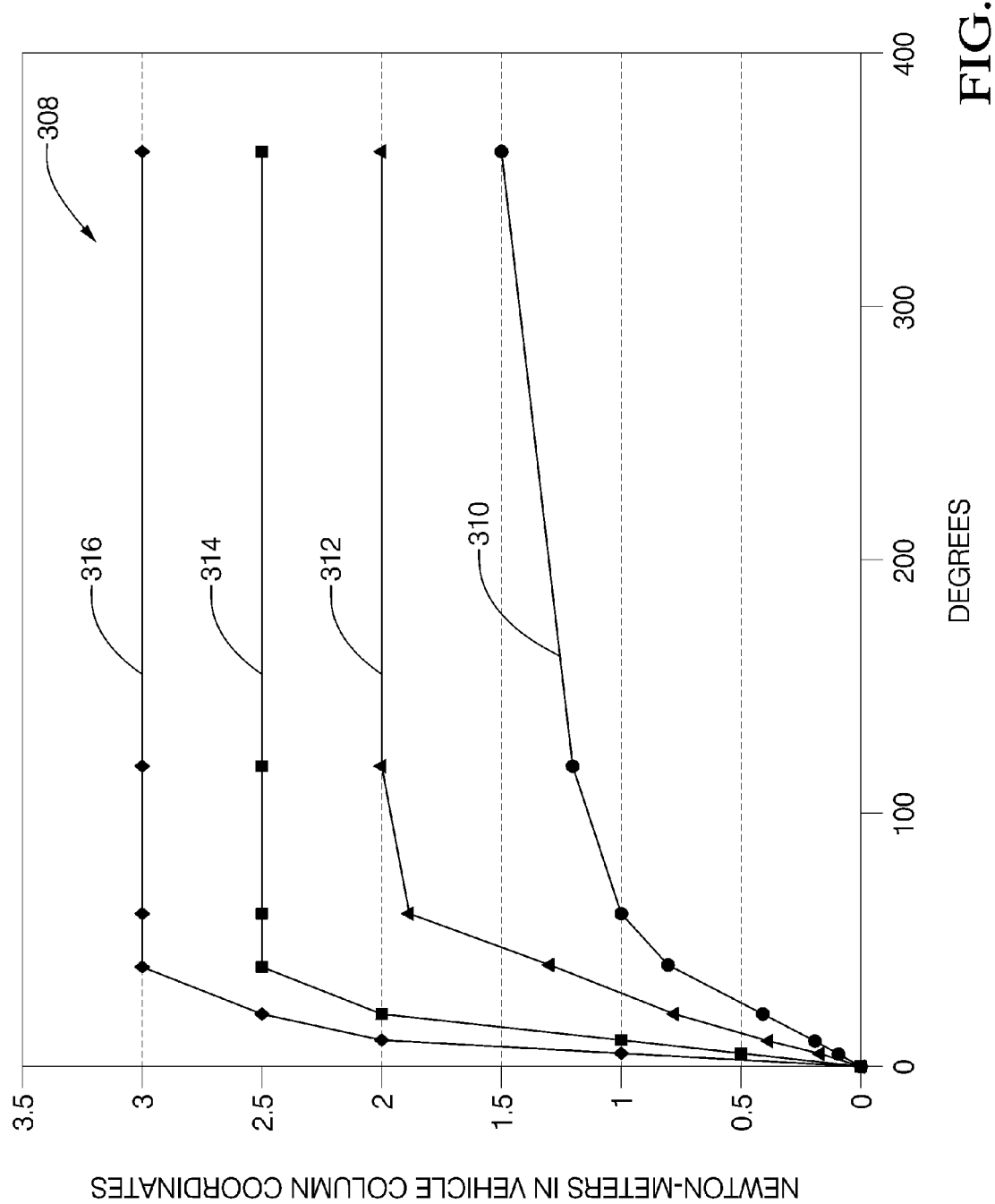
FIG. 14 is a schematic of exemplary curves illustrating commanded torque commands generated by the control system of FIG. 1 for the steering assist motor.

Referring to FIG. 14, exemplary curves of commanded torque values over time generated by the method of FIGS. 2-13 are illustrated. In particular, for example, the curve 310 represents commanded torque values over time generated by the Last Stored Position subroutine. Further, for example, the curve 312 represents commanded torque values over time generated by the Travel Exclusion subroutine. Further, for example, the curve 314 represents commanded torque values over time generated by the Autocentering subroutine when utilizing low speed calibration values. Further, for example, the curve 316 represents commanded torque values over time generated by the Autocentering subroutine when utilizing high speed calibration values.

Figure 15:
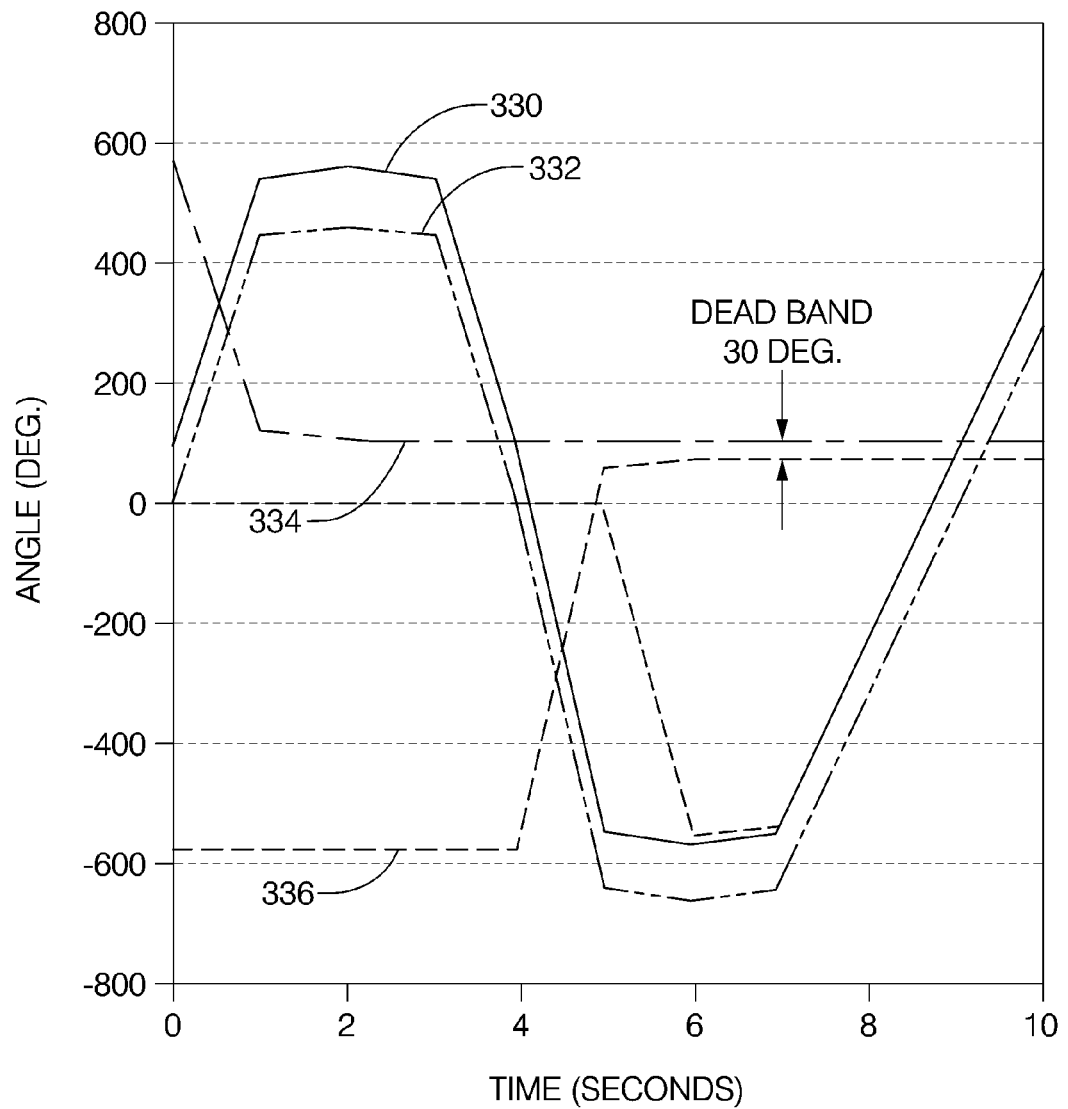
FIG. 15 is a schematic of exemplary curves associated with a Travel Exclusion subroutine implemented by the control system of FIG. 1.

Referring to FIG. 15, exemplary curves of position values determined by the Travel Exclusion subroutine are illustrated. In particular, a curve 330 corresponds to an actual absolute vehicle column position over time. Further, a curve 332 corresponds to the current relative rotational position value (Current_Rel_Pos) associated with the steering assist motor over time. Further, a curve 334 corresponds to the total absolute starting position value (Total_Max_Abs_Start_Pos) over time. Further, a curve 336 corresponds to the total minimum absolute starting position value (Total_Min_Abs_Start_Pos) over time. Finally, a distance along the y-axis between the curves 334 and 336 corresponds to the Deadband angular range.

As described above, the above-described methods can be embodied in the form of computer-implemented software algorithms and apparatuses for practicing those processes. In an exemplary embodiment, the methods are embodied in computer program code executed by one or more elements. The present methods may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

What is claimed is:

1. A method for determining an absolute rotational position of a vehicle steering column, the vehicle steering column being operably coupled to a steering assist motor, the method comprising:
   determining a plurality of relative motor rotational position values from signals received from a relative position sensor operably coupled to the steering assist motor;
   determining a plurality of relative vehicle steering column rotational position values based on the plurality of relative motor rotational position values;
   determining whether a vehicle is being driven substantially straight relative to a longitudinal axis of the vehicle on a roadway;
   when the vehicle is being driven substantially straight, then performing the step of determining a rotational position offset value from the plurality of relative vehicle steering column rotational position values; and
   determining an absolute rotational position value from a current relative vehicle steering column rotational position value and the rotational position offset value, the absolute rotational position value being indicative of the absolute rotational position of the vehicle steering column;
   storing the absolute rotational position value in a memory device;
   determining an absolute rotational position range of the vehicle steering column based on a plurality of absolute rotational position values, and both an upper rotational position limit value and a lower rotational position limit value associated with the vehicle steering column;
   retrieving a stored last valid absolute rotational position value from said memory device; and
   if a first confidence value associated with a first of said plurality of absolute rotational position values is greater than a first threshold value, then selecting the first absolute rotational position value, else if a second confidence value associated with the absolute rotational position range is greater than a second threshold value, then selecting the absolute rotational position range, else if a third confidence value associated with the stored last valid absolute rotational position value is greater than a third threshold value, then selecting the stored last valid absolute rotational position value.

2. The method of claim 1, wherein determining the absolute rotational position value comprises adding the current relative vehicle steering column rotational position value to the rotational position offset value to obtain the absolute rotational position value.

3. The method of claim 1, further comprising:
   determining whether an absolute rotational position range is fully rightwardly of an absolute center position of the vehicle steering column or fully leftwardly of the absolute center position of the vehicle steering column;
   if the absolute rotational position range is fully rightwardly or fully leftwardly of the absolute center position of the vehicle steering column, then generating a commanded torque command to induce the steering assist motor to move the vehicle steering column in a rotational direction toward the absolute rotational center position.

4. The method of claim 1, further comprising:
   determining whether an absolute rotational position range is fully rightwardly of an absolute center position of the vehicle steering column or fully leftwardly of the absolute center position of the vehicle steering column;
   if the absolute rotational position range is fully rightwardly of the absolute center position of the vehicle steering column, then generating a first commanded torque command to induce the steering assist motor to move the vehicle steering column in a first rotational direction toward the absolute rotational center position; and
   if the absolute rotational position range is fully leftwardly of the absolute center position of the vehicle steering column, then generating a second commanded torque command to induce the steering assist motor to move the vehicle steering column in a second rotational direction toward the absolute rotational center position, the second rotational direction being opposite the first rotational direction.

5. A method for determining an absolute rotational position of a vehicle steering column, the vehicle steering column being operably coupled to a steering assist motor, the method comprising:
   determining a plurality of relative motor rotational position values from signals received from a relative position sensor operably coupled to the steering assist motor;
   determining a plurality of relative vehicle steering column rotational position values based on the plurality of relative motor rotational position values;
   determining whether a vehicle is being driven substantially straight relative to a longitudinal axis of the vehicle on a roadway;
   when the vehicle is being driven substantially straight, then performing the step of determining a rotational position offset value from the plurality of relative vehicle steering column rotational position values; and
   determining an absolute rotational position value from a current relative vehicle steering column rotational position value and the rotational position offset value, the absolute rotational position value being indicative of the absolute rotational position of the vehicle steering column;
   storing the absolute rotational position value in a memory device;
   determining an absolute rotational position range of the vehicle steering column based on a plurality of absolute rotational position values;
   determining whether the absolute rotational position range is fully rightwardly of an absolute center position of the vehicle steering column or fully leftwardly of the absolute center position of the vehicle steering column;
   if the absolute rotational position range is fully rightwardly or fully leftwardly of the absolute center position of the vehicle steering column, then generating a commanded torque command to induce the steering assist motor to move the vehicle steering column in a rotational direction toward the absolute rotational center position.

* * * * *